(No Model.)
L. SCHUTTE.
CHECK VALVE.
No. 524,048.
Patented Aug. 7, 1894.
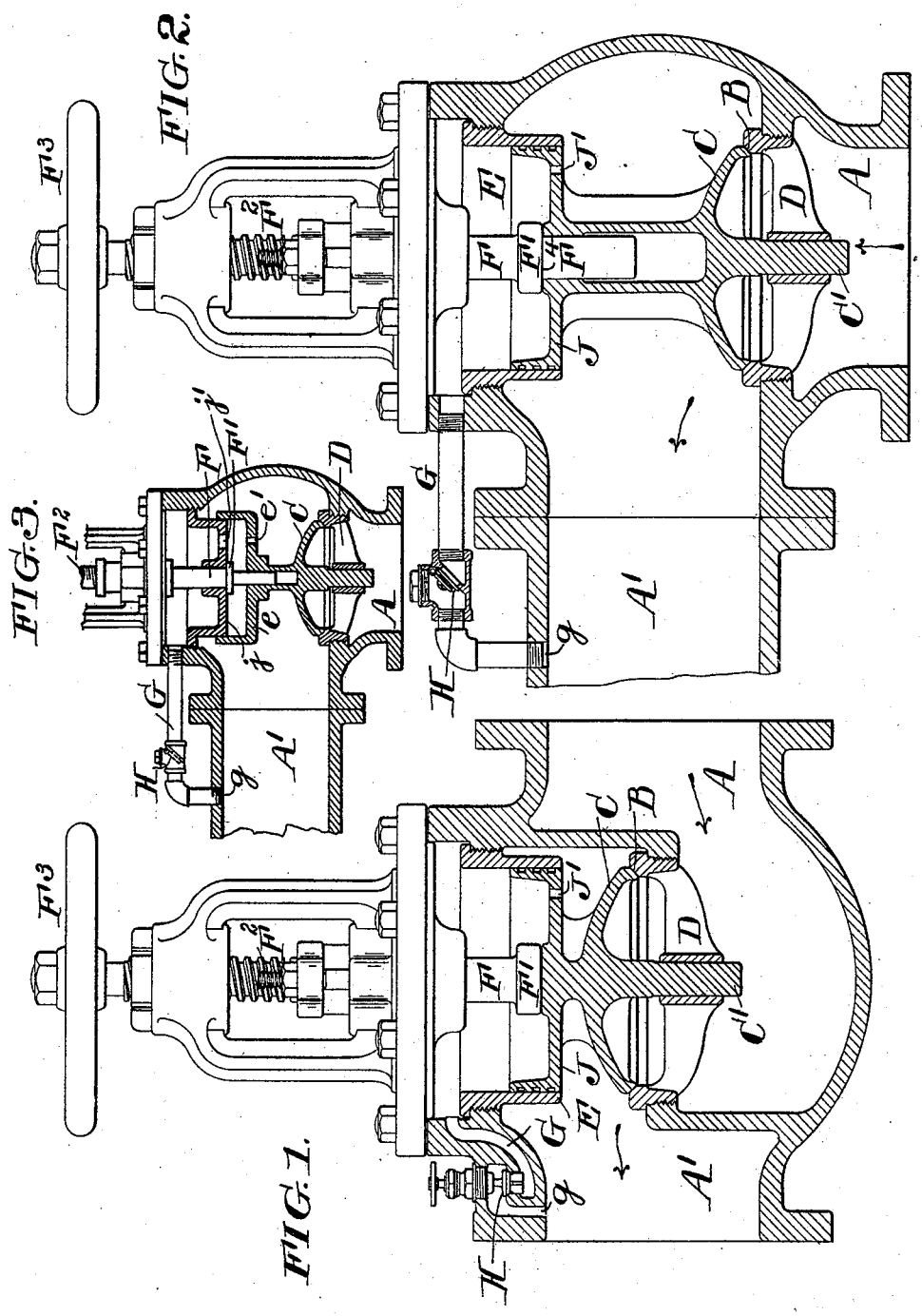

UNITED STATES PATENT OFFICE.

LOUIS SCHUTTE, OF PHILADELPHIA, PENNSYLVANIA.

CHECK-VALVE.

SPECIFICATION forming part of Letters Patent No. 524,048, dated August 7, 1894.

Application filed January 17, 1894. Serial No. 497,158. (No model.)

*To all whom it may concern:*

Be it known that I, LOUIS SCHUTTE, a citizen of the United States, residing in Philadelphia, in the county of Philadelphia and State of Pennsylvania, have invented a certain new and useful Improvement in Check-Valves, of which the following is a true and exact description, reference being had to the accompanying drawings, which form a part thereof.

My invention relates to check valves and has for its object to overcome the tendency of such valves to hammer in cases where the fluid passing through them has a pulsating flow, such, for instance, as has the steam when passing from a boiler to an engine, particularly where the engine works with a cut off, or a pump working with air vessels of insufficient capacity. I overcome this tendency by combining the valve with the movable member of a cylinder and piston, so placed and arranged that the said movable member will be on the outside exposed to the pressure of fluid on the discharge side of the valve, while the inside of the cylinder is also in communication with the discharge side of the conduit but through passages which are arranged to restrict the inflow of fluid so that the internal pressure will average less than the maximum pressure on the discharge side of the valve. In this way I overcome the tendency of the valve to close when the pressure falls temporarily but when the flow through the valve ceases the pressures on each side of the movable member will equalize each other permitting the check valve to seat itself.

The construction of my improved valve and the detailed features of my preferred construction will best be understood in connection with the drawings, in which—

Figures 1 and 2 illustrate valves of somewhat different constructions, but each provided with my improvements and Fig. 3 represents a modification in which the cylinder is the moving member and the piston is stationary, this being an obvious equivalent for the constructions shown in Figs. 1 and 2.

A and A' represent the receiving and discharge sides of a valve casing or conduit in which is situated a check valve C, B indicating the valve seat and D a guide for the valve extension C'.

E, Figs. 1 and 2, indicates a cylinder arranged concentrically with the valve C, and J is a piston working in said cylinder, and secured to the valve so as to move with it.

The fit between the piston and cylinder is loose to permit free movement and also because a leak in the joint is rather advantageous than detrimental, indeed, I prefer to form a restricted leak orifice, as J', in the piston J to connect the discharge chamber A' and the inside of the cylinder.

The construction heretofore described is operative to prevent hammering of the check valve in cases where the pulsations of flow in the conduit are of such a nature that the lower pressure prevails for a longer time than the higher pressure; the leak around the piston or through the hole J' in such case permitting the pressure in the cylinder to approximate the lower range of pressures and the action of the cylinder in such case being to hold the piston up and prevent the falling of the attached valve. In cases however where the maximum pressure is of longer relative continuance it is necessary to provide other means for insuring a lower pressure in the cylinder than in the conduit and this I accomplish by providing a conduit G leading from the cylinder to a point $g$ in the discharge conduit and of larger area than the effective leak passage or passages into the cylinder, and inserting in said conduit a non-return or check valve H arranged to open freely to permit escape of fluid from the cylinder but to close and cut off any flow into the cylinder. By this arrangement the fluid in the cylinder will escape freely through conduit G whenever the pressure in conduit A' falls below that of the fluid which has entered the cylinder through the leak apertures and as the leak passages are relatively small, the result is to maintain a relatively low pressure in the cylinder and thus insure against the falling of the valve during the pulsations of the flow.

In Fig. 3 practically the same construction is shown as in Figs. 1 and 2, except that in place of the piston J a cylinder $e$ is secured to the valve C and made to work upon a stationary piston $j$, $e'$ indicating a leak orifice in cylinder $e$ corresponding in function to orifice J', and the conduit G communicating with the interior of the cylinder through an orifice $j'$ in the piston $j$.

F indicates a valve spindle having a head F' which can be pressed down to lock the valve C to it seat, F² indicating a screw thread on the spindle and F³ a hand wheel for turning it. These parts form no part of my invention but are simply shown as ordinary fittings of such valves.

Having now described my invention, what I claim as new, and desire to secure by Letters Patent, is—

1. The combination of a main conduit, a check-valve situated therein, a cylinder and piston, the moving member of which is attached to the check-valve and is exposed externally to the pressure in the conduit on the delivery side of the check valve, a passage or passages leading from the inside of the cylinder to the main conduit also on the delivery side of the check-valve.

2. The combination of a main conduit, a check-valve situated therein, a cylinder and piston, the moving member of which is attached to the check-valve and is exposed externally to the pressure in the conduit, a passage or passages leading from the inside of the cylinder to the main conduit on the delivery side of the check valve, and a non-return or check valve arranged in a passage between the cylinder and conduit to permit the free escape of the fluid from the cylinder.

3. The combination of a main conduit, a check-valve situated therein, a cylinder and piston, the moving member of which is attached to the check-valve and is exposed externally to the pressure in the conduit, means as passage J' or the clearance between the piston and cylinder for permitting fluid from the conduit to enter the cylinder, an exit conduit as G of greater area than the inlet passage or passages leading from the cylinder to the main conduit on the delivery side of the check valve and a check valve H arranged in said conduit as described.

LOUIS SCHUTTE.

Witnesses:
ROBERT W. LLOYD,
D. STEWART.